(12) United States Patent
Eitel

(10) Patent No.: US 6,263,994 B1
(45) Date of Patent: Jul. 24, 2001

(54) ADVANCED MOTORCYCLE CHASSIS STEERING AND SUSPENSION SYSTEM

(76) Inventor: Frederick G. Eitel, 3579 William St., Lake Park, FL (US) 33403

( * ) Notice: Subject to any disclaimer, the term of this patent is extended or adjusted under 35 U.S.C. 154(b) by 0 days.

(21) Appl. No.: 09/164,502

(22) Filed: Oct. 1, 1998

Related U.S. Application Data

(60) Provisional application No. 60/060,939, filed on Oct. 3, 1997.

(51) Int. Cl.$^7$ .................................................. B62D 21/00
(52) U.S. Cl. .......................................... 180/219; 180/227
(58) Field of Search ........................... 180/219, 222–224, 180/227

(56) References Cited

U.S. PATENT DOCUMENTS

| | | |
|---|---|---|
| 1,952,967 | 3/1934 | Boughton .............................. 188/264 |
| 2,618,756 | 11/1952 | Fechheimer ............................ 310/54 |
| 4,013,148 | 3/1977 | Kobelt ............................... 188/264 D |
| 4,130,315 | 12/1978 | Shields ................................ 296/78.1 |
| 4,141,567 | 2/1979 | Scott ................................ 280/289 G |
| 4,398,741 | 8/1983 | Hiramatsu ............................. 280/283 |
| 4,411,333 | 10/1983 | Bothwell .............................. 180/219 |
| 4,494,800 | 1/1985 | Hayashi ............................... 303/6 A |
| 4,526,249 | 7/1985 | Parker ................................ 180/219 |
| 4,610,461 | * 9/1986 | Guzzetta ............................. 280/660 |
| 4,626,038 | 12/1986 | Hayashi et al. ....................... 303/6 C |
| 4,627,632 | * 12/1986 | McKagen ............................. 280/276 |
| 4,650,021 | 3/1987 | Matsuda et al. ....................... 180/219 |
| 4,650,022 | 3/1987 | Sato et al. ........................... 180/219 |
| 4,650,023 | 3/1987 | Matsuda et al. ....................... 180/219 |
| 4,655,311 | * 4/1987 | Matsuda et al. ....................... 180/219 |
| 4,664,214 | 5/1987 | Matsuda et al. ....................... 180/219 |
| 4,678,054 | * 7/1987 | Honda et al. ......................... 180/225 |
| 4,709,774 | 12/1987 | Saito et al. .......................... 180/229 |
| 4,756,379 | 7/1988 | Kawano et al. ....................... 180/219 |
| 4,756,547 | * 7/1988 | Trema ................................ 280/668 |
| 4,770,460 | 9/1988 | Miura et al. ......................... 296/78.1 |
| 4,776,422 | 10/1988 | Sakuma .............................. 180/219 |

(List continued on next page.)

*Primary Examiner*—J. J. Swann
*Assistant Examiner*—L. Lum
(74) *Attorney, Agent, or Firm*—Malin, Haley & DiMaggio, P.A.

(57) ABSTRACT

A motorcycle chassis embodies novel techniques, geometries and configurations in order to enhance performance. A mechanical arrangement is implemented to impose steering of front and rear wheels simultaneously for quicker steering response and maneuverability. The rear wheel steers at a smaller but proportional angle to that of the front, in the same direction. This allows a quicker roll rate when a turn is initiated. New techniques stabilize vehicle motion characteristics. A first is improved elevation attitude stability is achieved by the employment of anti-drive and anti-squat suspension control geometry to give essentially flat (elevation) attitude during acceleration and/or deceleration. A second is continuity of tire/pavement contact during acceleration and/or deceleration is further improved through use of a longer than normal wheel base and lower center of gravity. The longer wheel base does not compromise steering response of the proposed vehicle configuration when the two wheel steering feature described above is in place. A third is a low center of gravity is achieved by an arrangement that carries the fuel load within the chassis structure, below the engine. Better roll and yaw steering stability is achieved through an extremely rigid chassis, a product of the monocoque frame structure configured. Reduced dynamic flex minimizes the disconcerting tendency toward chassis self-steering over wavy pavement. A passive closed-loop suspension damping control mechanism is employed for better road holding characteristics. This unique sub-system exhibits progressive damping of shock absorbers, where rebound damping force is made proportional to (instantaneous) spring force provided by pneumatic springs. Damping rate is tunable in real time through the use of adjuster knobs accessible to the rider.

17 Claims, 5 Drawing Sheets

U.S. PATENT DOCUMENTS

| | | | | |
|---|---|---|---|---|
| 4,785,905 | * | 11/1988 | Trema | 180/219 |
| 4,794,998 | | 1/1989 | Iwai et al. | 180/219 |
| 4,807,898 | * | 2/1989 | Huntly | 280/276 |
| 4,813,511 | | 3/1989 | Yamaguchi et al. | 180/219 |
| 4,815,573 | | 3/1989 | Miyata | 180/264 F |
| 4,828,069 | | 5/1989 | Hatsuyama | 180/219 |
| 4,830,134 | | 5/1989 | Hashimoto | 180/219 |
| 4,883,149 | | 11/1989 | Campbell et al. | 180/264 E |
| 4,951,791 | | 8/1990 | Belil Creixell | 180/219 |
| 4,964,484 | | 10/1990 | Buell | 180/219 |
| 5,003,829 | | 4/1991 | DeConti et al. | 73/862.12 |
| 5,014,808 | | 5/1991 | Savard et al. | 180/219 |
| 5,067,580 | | 11/1991 | Parker | 180/219 |
| 5,069,303 | * | 12/1991 | Fuller | 180/219 |
| 5,113,964 | * | 5/1992 | Yamauchi | 180/224 |
| 5,133,223 | | 7/1992 | Morri | 74/496 |
| 5,156,231 | | 10/1992 | Trema | 180/227 |
| 5,330,028 | * | 7/1994 | Handa et al. | 180/219 |
| 5,358,077 | | 10/1994 | DeConti | 188/71.6 |
| 5,361,864 | | 11/1994 | Tanaka | 180/219 |
| 5,417,305 | | 5/1995 | Parker | 180/219 |
| 5,419,625 | | 5/1995 | Iwase et al. | 303/116.1 |
| 5,445,443 | | 8/1995 | Hauser et al. | 303/137 |
| 5,456,480 | * | 10/1995 | Turner et al. | 280/276 |
| 5,485,893 | * | 1/1996 | Summers | 180/219 |
| 5,490,573 | | 2/1996 | Hagiwara et al. | 180/68.1 |
| 5,503,244 | | 4/1996 | Beirlein | 180/219 |
| 5,769,442 | * | 6/1998 | Robinson et al. | 280/281.1 |
| 5,782,313 | * | 7/1998 | Kurawaki et al. | 180/219 |
| 5,799,963 | * | 9/1998 | Berkmann | 280/276 |
| 5,845,728 | * | 12/1998 | Itoh et al. | 180/219 |
| 5,853,651 | * | 12/1998 | Lindsay et al. | 264/512 |

* cited by examiner

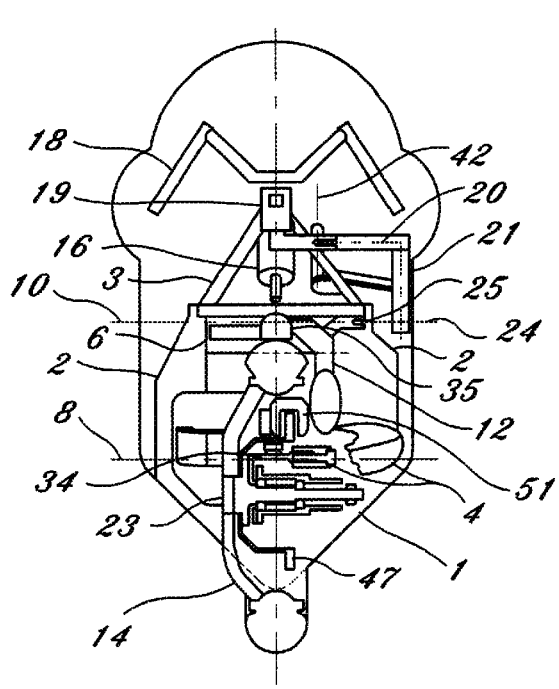
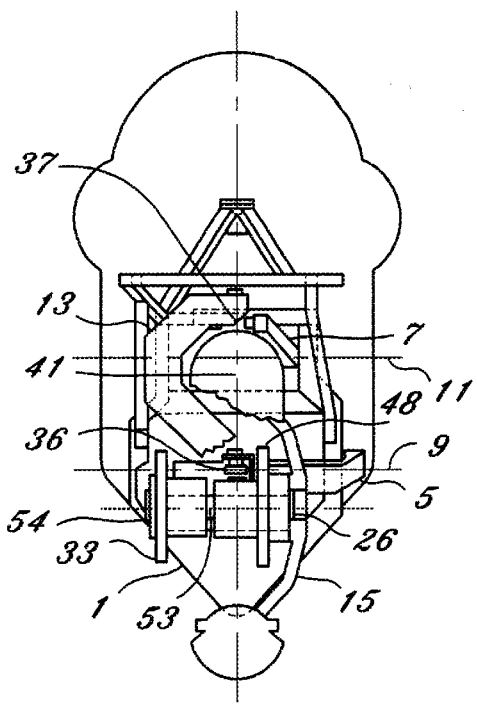
FIG. 3   FIG. 4
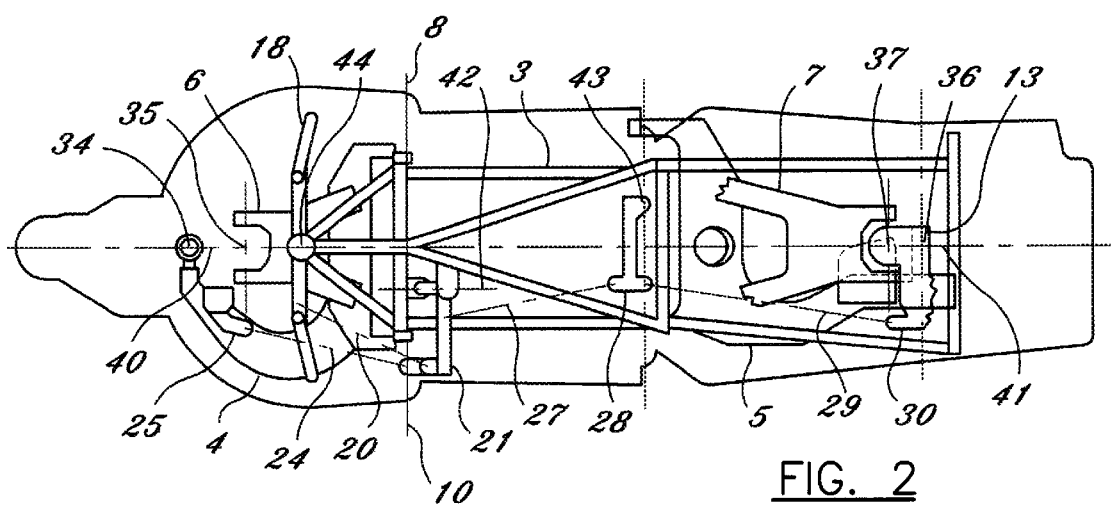
FIG. 2

SECT. A-A

ADVANCED MOTORCYCLE CHASSIS STEERING AND SUSPENSION SYSTEM

CROSS-REFERENCE TO RELATED APPLICATIONS

This application claims the benefit of U.S Provisional Application No. 60/060,939, filed Oct. 3, 1997.

STATEMENT REGARDING FEDERALLY SPONSORED RESEARCH OR DEVELOPMENT

N/A

BACKGROUND OF THE INVENTION

1. Field of the Invention

This invention relates generally to the field of motorcycles, and in particular, to a motorcycle chassis which embodies novel techniques, geometries and configurations in order to enhance motorcycle performance, and particularly in the area of chassis, steering, and suspension performance.

2. Description of Related Art

Modern road going motorcycles are characterized by mostly evolutionary methodology and arrangements that have developed over the past forty-five years. A number of terms have been used and applied over the years of this evolution in the motorcycle art which are used in describing the related art and the inventive arrangements taught herein.

The following list of terms and their definitions will facilitate understanding the description of the invention:

An accumulator is a vessel containing compressed gas behind a piston or diaphragm. Hydraulic fluid can enter the vessel on one side of the piston or diaphragm without mixing with the gas. Gas and fluid pressure vary with changes in contained fluid volume.

Area moment of inertia is a structural property used to calculate bending stiffness and stress, a function of incremental area and the radius from its bending axis.

Bank is the slope or rotation about the axis of flight. Bank angle for a motorcycle is the angle between the tire center plane and a vertical plane through the tire contact patches.

Bump/steer is a term used to describe the tendency of a vehicle to deviate from a steered path when the suspension is suddenly compressed. Bump/steer results from interaction between steering linkage and suspension linkage, often representing design compromise and/or poor engineering.

Carbon/carbon is a composite of graphite fibers and carbon matrix, noted for its low mass density and high conductivity.

Center hub steering is motorcycle jargon that indicates one or more steering pivots located within the tire cross-section on its center plane.

The center of gravity (CG) is the apparent center point of a distributed mass. No rotation will occur in response to forces through this point of balance.

A centroid is the center of cross-sectional area.

Couple is two equal and opposite forces separated by a distance that produces (or resists) a moment.

Damping is the conversion of energy associated with mass and velocity into heat. Controlled fluid resistance or mechanical friction devices are generally used to dampen the unwanted vibrational energy associated with vertical wheel motion on vehicles.

Dive is a sudden descent. Used herein, dive refers to the tendency of a vehicle to pitch forward in response to braking forces, compressing the front suspension.

Dynamic refers to motion or laws of motion, translation and/or rotation.

Fairing generally refers to partial streamlining. Used herein, fairing refers specifically to plastic or fiberglass bodywork that comprises the complete streamlining shell for the motorcycle.

Inertia is general term for the tendency of matter to remain at rest, or to keep moving in the same direction unless acted on by a force. Inertia and mass are identical terms for linear acceleration.

Mass moment of inertia is a dynamic property which defines the resistance to rotation of a solid body about a center, a function of incremental weight in pounds, and the radius in inches from rotation axis.

Moment is the product of force times the lever arm length over which it acts.

Monocoque is a lightweight structural technique originating in the aircraft industry. Loads are carried in a stressed skin, forming the outside of the structure. The skin must form a closed box to form a stiff unit.

An orifice is a hole or reduced flow area sized to reduce flow rate or cause pressure loss at a given flow rate in hydraulic systems.

Pack down refers to the incomplete rebound of a suspension damping member, which reduce available travel for the next damping cycle.

Progressive rate generally refers to a non-linear spring rate. Ordinary springs exhibit compression distance proportional to force. Progressive wound springs require ever increasing force to produce an incremental compression.

Rising rate generally describes a suspension which produces an apparent progressive rate to wheel motion. In motorcycle jargon, a rising rate suspension refers to mechanical linkage that produces the progressive characteristic with linear springs.

A space frame is a three dimensional light-weight structure composed of tubes or solid bars that act primarily in tension and/or compression.

Squat is the tendency for a vehicle to crouch over its rear wheel in response to acceleration forces, compressing the rear suspension.

A stoppie is a reverse wheelie where the rear wheel lifts off the pavement. In this case, the deceleration moment overcomes the gravity moment.

A strut is a device which supports vehicle weight and allows compression motion, usually a shock absorber surrounded by a coil spring. Its use herein refers to a hydraulic cylinder which is pressurized from a remote accumulator.

Trail is a term which describes steering geometry. The trail is the distance the tire contact patch follows the steering axis at ground level, usually 3.0 to 5.0 inches. Less trail gives more responsive steering, but reduces stability.

A truss is a framework of tubes or struts for structural support. A space frame is a type of truss. The words space frame and truss are used interchangeably herein to indicate space frame structure.

A wheelie refers to the condition of a motorcycle accelerating with the front wheel elevated from the pavement. During a wheelie, the acceleration moment overcomes the gravity moment, achieving 100% weight transfer to the rear wheel.

In heretofore motorcycle construction, frames are primarily constructed of steel or aluminum. The tubular type frame construction utilizes steel members above and below the engine, terminating at a steering stem in front, and swing arm pivot at the rear. Multi-tube space frame structures are sometimes used for increased stiffness and lighter weight, most commonly with a single cylinder or 90 degree V-twin engines which offer less obstruction to the volume requirement imposed by such a structure.

Recent efforts have concentrated on aluminum "perimeter" frames. These use larger section members that surround the sides of the engine in a wide stance. They provide somewhat better torsional stiffness, a more direct load path between steering stem and swing arm pivot, and open access to the top and bottom of the engine.

Motorcycle steering is achieved by the use of handle bars attached directly to the steered member. Paired telescopic struts form a fork supporting the front wheel and serve double duty as the steered member and as the front suspension. Static friction in fork bushings and seals resists smooth action over bumps during heavy braking. Also, the telescopic fork arrangement, by virtue of it's length and slenderness, is relatively flexible in its resistance to brake and suspension loads, a low stiffness component in the structural chassis system. Chassis flexibility is an undesirable parameter in the search for crisp, responsive handling and stability. Moreover, fork legs and springs contribute to mass moment of inertia about the steering axis. The inertia resists rapid steering motions, contributing to rider fatigue.

Another characteristic of telescopic fork geometry is front suspension dive under hard braking. This is caused partially by weight transfer, a function of CG height, wheelbase and vehicle mass. Dive is exaggerated with the telescopic arrangement due to the necessary caster angle of the fork and steering stem. A braking force component applied along the spring/slider axis of the fork, approximately 24 degrees from vertical, results in additional compression of the front suspension, loss of ride height and (sometimes) bottoming of the suspension. Dive is accompanied by a reduction in steering caster angle and therefore stability.

To combat these difficulties, double leading link front suspension has been reborn and modernized in several recent examples such as Elf, Radd-Yamaha, Bimota and others. MacPherson types (single link/telescopic strut) have also emerged, the most successful by BMW. Most of these reduce the dive tendency and some apply anti-dive geometry to a limited degree. Steering friction increase is a practical issue with the latter types, especially under brake loads, due to a use of spherical plain bearings in the system. The spherical plain bearings are used in order to accommodate compound (steering and suspension) angular motions.

Motorcycle cornering is effected by first banking to an angle that achieves a centrifugal (radial) moment about the tire contact axis equal to the gravity (vertical) moment, at the desired cornering radius. The moment balance is maintained throughout the corner by the rider making small balance and steering corrections. With properly designed steering geometry, the motorcycle will sustain bank angle with little rider effort. The initial roll-in can be executed by rider weight shift during leisurely transition from vertical to banked.

For rapid directional change, as required in racing, the "counter-steer" technique is utilized. Counter-steer involves turning the steering member quickly in the direction opposite to the direction of turn until the desired bank angle is achieved, then back to a neutral position. Counter-steer places the front tire contact patch outboard of the vehicle CG while motion of the CG is resisted by its own inertia, producing bank angle. The ensuing gravity (vertical) moment assists the roll-in. Because the counter-steer maneuver is resisted by the entire rotational inertia of the laden vehicle mass, a rider's strength and stamina are taxed by close consecutive course bends at speed.

The design of road racing motorcycles emphasizes light weight and short wheel base to assist counter-steer for better maneuverability. Both parameters compromise straight-line stability. Reduction in wheel base increases weight transfer during hard acceleration or braking. This is evident in wheelies and stoppies, phenomena which require exceptional rider skill to deal with.

Motorcycle braking is almost always independent, front and rear wheel systems separately applied by hand and foot. Braking effectiveness, therefore is largely a function of rider sense and skill in the appropriate application of braking force to each wheel, short of wheel lockup. Anti-lock brake systems are available in some makes and models, but these systems reduce the available deceleration rate, especially on dry pavement. This is due to intermittent braking (interruption) when a wheel threatens to lock. A skilled rider can often slow or stop in a shorter distance without the anti-lock feature.

Air cooling of brakes is universal in motorcycles. Disk brakes are conventional, made of stainless steel, iron, or carbon-carbon material. Carbon-carbon is a light weight but costly material with higher temperature capability than the others. The disadvantage of carbon-carbon is frictional characteristics that vary widely over its use temperature. As disk temperature rises, stopping power increases. Much reduced stopping power is available when cold, however, and some racing organizations have ruled against the use of carbon-carbon brakes for safety reasons.

Liquid cooling of brakes has not found application in motorcycles because of cost, weight, physical size and packaging constraints, and safety concerns. Coolant must be well contained to prevent wetting the tires. Heated liquid and/or steam discharge must not be allowed proximity to the rider to prevent potential injury. However, liquid cooled brakes offer performance advantages over conventional air cooled brakes as fully described hereinbelow.

Suspension systems generally use coil springs. Sport and racing machines often employ progressive springs or rising rate spring loading geometry for tighter control of wheel travel. Damping is hydraulic, usually with adjustable (settable) damping rates. Damping force follows sinusoidal character through the wheel stroke excursion, with more rebound damping than in compression. Fixed hydraulic orifices result in instant damping force proportional to the square of stroke velocity. Insufficient damping allows bouncing to continue. Too much rebound damping causes the suspension to pack down, the incomplete rebound reducing available travel for the next cycle. Rebound damping usually employs a fluid orifice ideally sized for critical damping rate. Compression damping, however, is reduced by the addition of a pressure relief valve in parallel with a fixed orifice. This prevents excess damping force in response to extreme pavement amplitude (bumps or pot holes), allowing more suspension travel and a softer ride.

The tuning of shock absorbers is a trial and error process to find the best perceived adjustment for a set of conditions, type of riding, and or race course. Optimum damping applies only to a particular series of pavement perturbations and vehicle speed with this type of system.

Aerodynamic fairing bodywork is common to modern sport and racing motorcycles. By convention and or racing rules the fairing extends from the front axle to rear tire trailing edge. The rider is completely exposed from the side and rear view, but can be nearly hidden behind the fairing when viewed from the front. Wheels are also exposed in the side view. Wheels are open spoked structures, with tires partially covered by fenders with air cooled disk brakes to the sides on front wheels. Engine exhaust pipes run below the engine and exit through mufflers at the rear, located to the side and high for cornering clearance. The exhaust pipes are sometimes partially enclosed by the fairing. The riders hands extend beyond the fairing width, exposed to accommodate handlebar width sufficient for adequate steering leverage. Liquid cooled engines require a radiator, generally placed immediately in front of the engine. A forward facing aperture in the fairing ducts most of the through-flow air into the radiator. The warm air exits around the engine and out through side vents in the fairing forward of the riders legs, some continuing through to the rear wheel well.

The primary measurement of motorcycle performance for those skilled in the art would be achievable lap time on a closed racing circuit. Useful parameters of improved performance include: steering response and maneuverability; stability in motion; road holding/cornering ability; aerodynamic efficiency/rider wind protection; and, deceleration rate/stopping ability. All of these parameters need to be addressed to move the evolutionary development of motorcycles ahead in an uncharacteristically large step forward.

BRIEF SUMMARY OF THE INVENTION

The parameters described hereinabove are addressed by various aspects of the invention as disclosed hereinbelow. Numerous motorcycle improvements taught herein include, but are not limited to, the following:

1. A mechanical arrangement that implements rear wheel steering angle in proportion to front wheel steering angle for quicker steering response of a motorcycle.

2. An improved motorcycle front suspension/steering arrangement that incorporates:
   a.) double leading link suspension arms with geometry to resist front end dive in response to braking;
   b.) Center hub steering ball joint pivots that incorporate rolling bearings on the steering axis for reduced steering friction;
   c.) Suspension spring/shock unit location that applies support loading coincident with the tire center plane to avoid chassis twist;
   d.) Steering linkage arrangement and geometry that does not exhibit bump-steer; and,
   e.) Steering linkage geometry that provides mechanical advantage between steering handle bar and wheel (steering) pivot axis.

3. An improved motorcycle rear suspension/steering arrangement that incorporates:
   a.) double trailing link rear suspension arms with geometry to resist rear end squat in response to acceleration, and resist rear end rise in response to braking;
   b.) Center hub steering ball joints that employ rolling bearings on the steering axis;
   c.) Suspension spring/shock unit location that applies support loading coincident with the tire center plane;
   d.) Steering linkage arrangement and geometry that does not exhibit bump-steer characteristics; and,
   e.) Steering linkage arrangement and geometry that provides mechanical advantage between steering handle bar and wheel steering pivot axis.

4. An improved suspension spring/shock absorber unit that incorporates:
   a.) A pneumatic spring medium to provide progressive (rising) spring rate in response to wheel vertical motion;
   b.) A progressive damping shock absorber system configured to closely match damping rate to the spring rate characteristic of wheel vertical motion; and,
   c.) A method for adjusting the degree of shock absorber damping by the operator while the vehicle is in motion.

5. A motorcycle chassis, including:
   a.) monocoque and truss construction and disposition configured to provide exceptional torsional rigidity between front and rear axles; and,
   b.) component arrangement to nrovide a low center of gravity without compromise to cornering clearance.

A mechanical arrangement is implemented to impose steering of front and rear wheels simultaneously for quicker steering response and maneuverability. The rear wheel steers at a smaller but proportional angle to that of the front wheel, in the same direction. This allows a quicker roll rate when a turn is initiated. Dual trailing control arms are used to limit rotation of the rear steering axes during suspension motion in concert with unique steering transfer linkage that exhibits no bump/steer.

In another arrangement, stabilization of vehicle motion characteristics is implemented. Improved elevation attitude stability is achieved by the employment of anti-dive and anti-squat suspension control geometry to give essentially flat (elevation) attitude during acceleration and/or deceleration. The continuity of tire/pavement contact during acceleration and/or deceleration is further improved through use of a longer than normal wheel base and lower center of gravity. The longer wheelbase does not compromise steering response of the proposed vehicle configuration because the two wheel steering feature described above is in place. A low center of gravity is achieved by an arrangement that carries the fuel load within the chassis structure, below the engine. Better roll and yaw steering stability is achieved through an extremely rigid chassis, a product of the monocoque frame structure configured. Reduced dynamic flex minimizes the disconcerting tendency toward chassis self-steering over wavy pavement.

In accordance with still another inventive arrangement, passive closed-loop suspension damping control mechanism is employed for better road holding characteristics. This unique sub-system exhibits progressive damping of shock absorbers, where rebound damping force is made proportional to instantaneous spring force provided, at least in-part, by pneumatic springs. This provides suspension damping that responds to variable suspension spring rate and compensates for deceleration weight transfer. Damping rate is tunable in real time through the use of adjuster knobs accessible to the rider.

Accordingly, it is an object of the present invention to provide a non-parallel, double leading arm front suspension with steering linkage geometry that does not exhibit bump/steer.

It is another object of the present invention to provide a double leading arm front suspension with steering linkage geometry that provides mechanical advantage between the steering bar and the wheel steering pivot axis.

It is still another object of the present invention to provide a double leading arm front suspension with rolling bearings on the steering axis at the arm forward ball joint pivots.

It is yet another object of the present invention to provide a double leading arm front suspension that locates the spring/shock unit to apply support loading coincident with the tire center plane, to avoid twist in the support arm and frame.

It is another object of the present invention to provide a double trailing arm rear suspension with steering linkage geometry that does not exhibit bump/steer.

It is another object of the present invention to provide a double trailing arm rear suspension with rolling bearings on the steering axis at the arm rear ball joint pivots.

It is another object of the present invention to provide a double trailing arm rear suspension that locates the spring/shock unit to apply support loading coincident with the tire center plane.

It is still another object of the present invention to provide a monocoque chassis and truss frame configured to produce high torsional stiffness between front and rear wheel axles that utilizes leading and trailing suspension arms.

It is yet another object of the present invention to provide a monocoque chassis and truss frame that integrates the fuel tank into the monocoque structure.

It is another object of the present invention to provide a suspension spring/shock absorber system that incorporates a pneumatic spring medium to provide a controllable progressive (rising) spring rate in response to wheel vertical motion.

It is another object of the present invention to provide a suspension spring/shock absorber system that actively tailors damping to the spring rate characteristic of wheel vertical motion.

It is a further object of the present invention to provide a suspension spring/shock absorber system that provides for adjusting the average degree of shock absorber damping by the operator while the vehicle is in motion.

In accordance with these and other objects which will become apparent hereinafter, the instant invention will now be described with particular reference to the accompanying drawings.

BRIEF DESCRIPTION OF THE SEVERAL VIEWS OF THE DRAWINGS

FIG. 2 is a top plan view of that of FIG. 1.

FIG. 3 is a cross-sectional view taken along line A—A in FIG. 1.

FIG. 4 is a rear elevational view, partially cut-away, of that of FIG. 1.

DETAILED DESCRIPTION OF THE INVENTION

Figure 1:
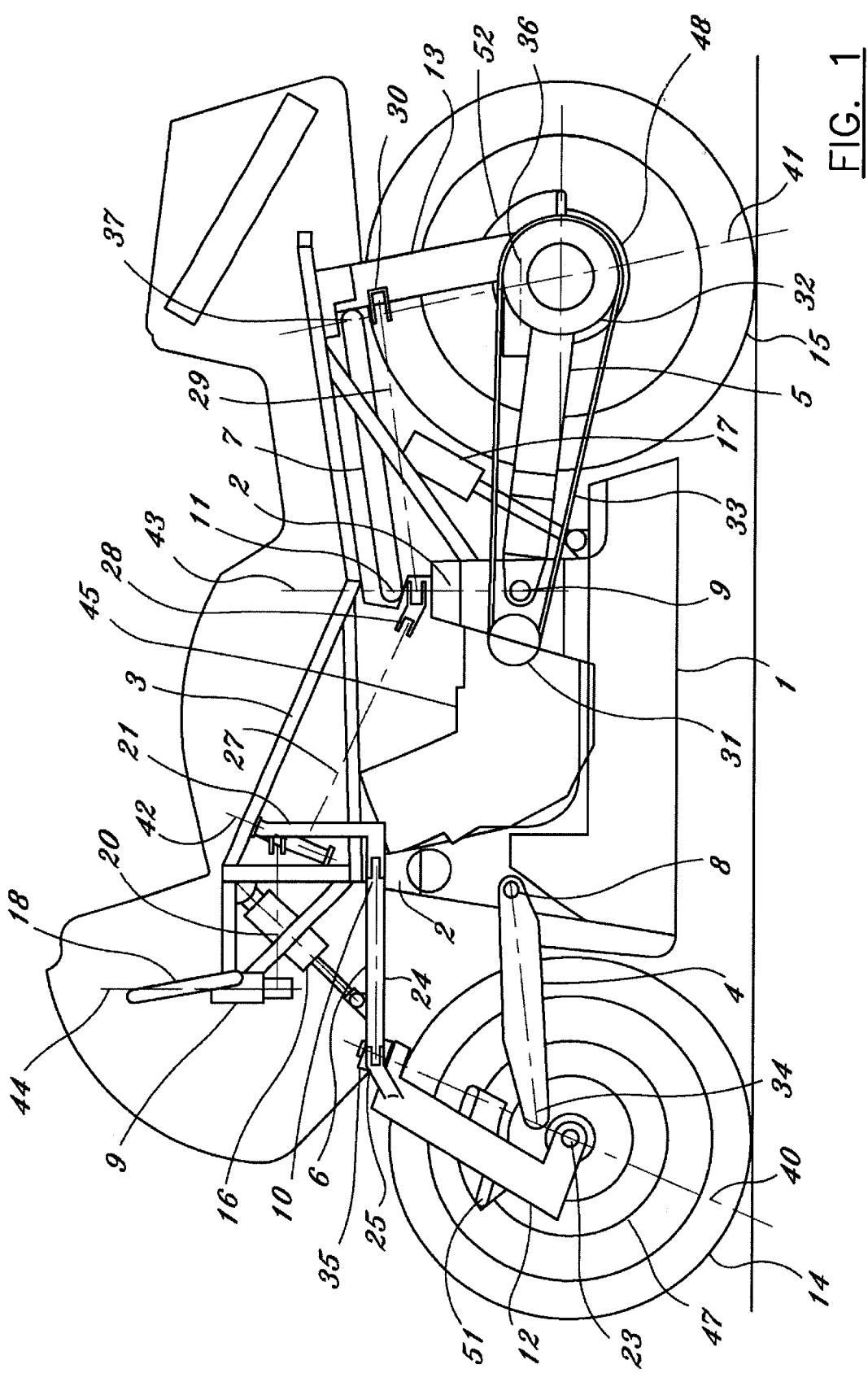
FIG. 1 is a side elevational view, partially cut-away, of the chassis frame and suspension of the present invention.
Figure 5:
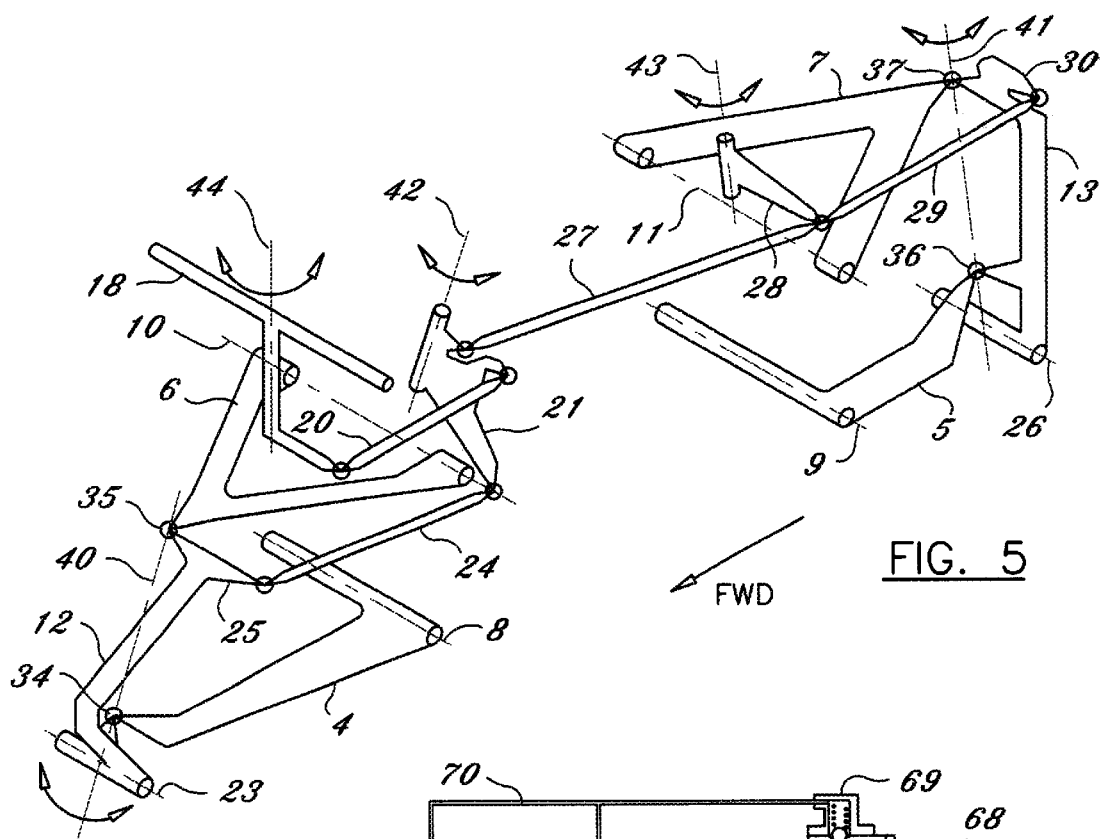
FIG. 5 is a diagrammatic view illustrating the steering linkage of the present invention.

Referring to FIGS. 1–5, the preferred embodiment of the present invention includes overall improvements to motorcycle frame structure, suspension control, steering, and handling. The following legend includes the features and reference numerals shown in FIGS. 1–5:

1 Main Frame Structure;
2 Posts (4 each);
3 Upper Truss Structure;
4 Forward Lower Suspension Arm;
5 Aft Lower Suspension Arm;
6 Forward Upper Suspension Arm;
7 Aft Upper Suspension Arm;
8 Forward Lower Static Pivot;
9 Aft lower Static Pivot;
10 Forward Upper Static Pivot;
11 Aft Upper Static Pivot;
12 Front Upright Member;
13 Rear Upright Member;
14 Front Wheel;
15 Rear Wheel;
16 Front Shock Absorber Strut;
17 Rear Shock Absorber Strut;
18 Handlebar;
19 Handlebar Pivot;
20 Upper Front Link;
21 Front Idler Arm;
22 Foot Peg;
23 Front Axle;
24 Lower Front Link;
25 Front Upright Steering Arm;
26 Rear Wheel Axle;
27 Intermediate link;
28 Rear Idler Arm;
29 Rear Link;
30 Rear Upright Steering Arm;
31 Engine Sprocket;
32 Rear Sprocket;
33 Drive Chain;
34 Front lower Steering Pivot (2 axis pivot);
35 Front Upper Steering Pivot (2 axis pivot);
36 Rear Lower Steering pivot (2 axis pivot);
37 Rear Upper Steering Pivot (2 axis pivot);
40 Front Steering Axis;
41 Rear Steering Axis;
42 Front Idler Arm Pivot Axis;
43 Rear Idler Arm Pivot Axis;
44 Handlebar Pivot Axis;
45 Engine/Transmission;
46 Exhaust Pipe;
47 Front Brake Disk;
48 Rear Brake Disk;
49 Front Shock Accumulator;
50 Rear Shock Accumulator;
51 Front Brake Caliper;
52 Rear Brake Caliper;
53 Drive Shaft; and,
54 Rear Sprocket Axle.

The main frame structure 1 is monocoque, utilizing a large triangular cross-section preferably of sheet metal fabrication. It extends from just aft of the front wheel 14 to just forward of the rear wheel 15. The centerline of the frame area-centroid resides slightly below axle height to provide a very short structural load path between wheels, supporting the engine 45 at mid-span. Four posts 2 extend upward at each end of the main frame 1 to locate static pivots for the four suspension swing arms. The posts are joined by an upper truss structure 3 of tubes to enhance torsional stiffness. Fuel is carried in the hollow main frame 1 described, to utilize otherwise wasted volume, also contributing to a low center of gravity for the machine.

The main frame 1 is augmented by the truss structure 3 at the top. The primary function of the truss is to rigidly tie together the four posts 2 that extend from the main frame 1. Auxiliary functions are to provide an anchor for the front shock absorber strut 16, a pivot axis for the handlebar 18 pivots for steering idler arms 21 and 28, a seat substructure, foot peg 22 supports for the rider, and mounts for other accessories.

The large triangular cross-section (looking forward or aft) of the main frame 1 exhibits a high degree of torsional and bending stiffness due to a large area moment of inertia, extending between forward and aft lower suspension arm static pivots 8 and 9. The major source of frame dynamic loading originates at the lower static pivots. The three surfaces of the triangular cross-section are disposed longitudinally, with no bends or kinks which might induce local bending moments. Acceleration and braking loads cause essentially compressive stress in the main frame. Smaller deflections are characteristically exhibited under compression or tension, than are due to bending or torsional stress at a given loading and cross-section, the advantage of direct load path. Cornering load variations due to uneven road surface result in bending (rather than torsional) stress and deflection with the geometry of the present invention.

Bending exhibits a lesser degree of self-steering deflection than with combined bending and twist that would be exhibited with a deviated load path present in a more conventional main frame structure. The tubular truss sub-frame 3 mounted above the engine 45 adds bending and torsional stiffness to the overall structure and aids in resisting loads from the upper suspension arm pivots 10 and 11 as they are directed into the chassis. The engine preferably attaches to the chassis with vibration isolation mounts, and therefore, does not contribute to stiffness.

Two swing arms 4 and 6 extend forward from transverse horizontal axis pivots 8 and 10, in the main frame 1 and posts 2. The arms 4 and 6 terminate forward in two-axis pivots 34 and 35 which carry a tubular member, the front upright 12. The front axle 23 is carried in the front upright 12. Azimuthal rotations of the front upright 12 about the two mentioned pivots 34 and 35 provides the steering motion for the front wheel 14. The steering axis 40 is located through the tire center plane.

Elevation rotation of the two swing arms 4 and 6 provides suspension travel in near parallelogram motion. Movement of the suspension arms does not interfere with steering elements and the lower suspension arm 4 resides on the left side only, with adequate clearance to permit steering to the right. Pivot geometry of the front upright member 12 is positioned to give 3.0 to 4.0 inches (value determined by detail design) of tire contact trail at ground level.

The rear suspension and steering arrangement is almost a mirror image of the front, with two trailing arms 5 and 7, rear upright 13, and appropriate pivots 9, 11, 36 and 37. The rear upright is also allowed to steer, but to a lesser angle. The rear upright pivot geometry results in approximately 1.0 inch of negative trail.

The shock absorber struts 16 and 17 define ride height and control suspension arm 4, 5, 6 and 7 motion. The front strut 16 is attached to the front upper arm 6, extends up and aft, and is anchored to the truss 3. The strut compresses when the front wheel 14 rises. The rear strut 17 attaches to the rear upper arm 7, extends forward and down through a hole in the lower arm 5, and is anchored to the main frame 1. The strut 17 extends when the rear wheel 15 rises.

Referring to FIGS. 1, 2, 3 and 5, front wheel steering is executed through transfer linkage. Handlebar 18 motion moves an upper link 20. Upper link 20 in turn moves the front idler arm 21. A lower link 24, attached to the idler arm 21, moves an arm 25 rigidly attached to the top of the front upright 12. Both links 20 and 24 are equipped with rod end ball joints to accommodate compound motion. Steering motion of the handlebar 18 moves the front idler arm 21 and the front upright arm 25 through identical radii. Moreover, the ball joints in the lower steering link 24, when in mid steering position, align with the respective upper suspension arm pivot axes 10 and 35. The described geometry ensures that both the upper suspension arm 6 and the lower steering link 24 travel in parallel and equal arcs during suspension motion, regardless of steering angle. This eliminates the dangerous phenomenon known as "bump/steer". Steering will remain stable through choppy turns in the absence of "bump-steer". Use of transfer linkage for steering allows mechanical advantage for reduced steering effort. Approximately 1.25 degrees of handlebar motion results in 1 degree of front wheel steering (5/4 ratio). Rear wheel steering is executed through a transfer linkage similar to that of the front mechanism illustrated in FIGS. 1, 2, 4 and 5.

An intermediate link 27 extends from a point on the front idler arm 21 to the rear idler arm 28. The intermediate link 27 pivots are located on preselected positions on respective idler arms 21 and 28 to give, preferably, approximately 5/1 front to rear steering ratio. A rear link 29 extends from the rear idler arm 28 to an arm 30 rigidly attached to the top of the rear upright member 13. The rear link 29 axis resides offset from the plane of the top rear swing arm 7. Rear steering geometry is also configured to prevent bump/steer, i.e., the rear link 29 and rear upper and lower arm pivots 37 and 36 swing proportional arcs.

In this case, pivots align with lines drawn perpendicular to extensions through static and moving 37 and 36 pivots, respectively. The height of each link pivot above (or below) respective upper swing arm pivot maintains the same ratio respective distance between static and moving control arm pivots on each construction line, as illustrated in FIG. 1. Deviation from front end arrangement adds geometric complexity, but conserves rider leg space. The result, however, is identical to the front arrangement where the link 24 traverses the same arc as the top swing arm 6.

The linkage steers the rear wheel in the same direction as that of the front at an angle proportional to that of the front. This allows much quicker "roll-in" to initiate a (bank) turn than is possible with a rear wheel that does not steer. The front to rear steering ratio can be changed via alternative radius pivot positions (not shown) on the front idler arm to suit rider preference (and/or race course). A turnbuckle in each link permits adjustment of length, if needed.

Rear wheel steering capability adds some complexity to the drive mechanism. Conventional chain 33 drive from engine sprocket 31 to rear sprocket 32 is maintained. The rear sprocket, however, is not attached to the wheel, but is carried by a hollow shaft 54 and two bearings located in the aft section of the lower rear control swing arm 5. The wheel 15 is similarly carried by a hollow axle shaft 26 and two bearings located in the lower extremity of the rear upright member 13. Shaft axes are nominally coaxial. A smaller drive shaft 53 extends between the two hollow shafts 54 and 26 inside the hollow space to transmit drive torque. Both ends of the drive shaft 53 are equipped with universal joints.

The center of the right-hand universal joint coincides with the rear wheel steering axis 41 so that its center remains stationary relative to the steering axis. The output end of the universal joint is attached to the hollow axle shaft 26, to which the rear wheel is joined. The drive shaft design can accommodate motion traversed by the two hollow shafts and steering of the rear wheel. Axial clearance between the rear lower control arm and the rear upright member 13 accommodates the rear steering motions without collision between elements.

Figure 6:
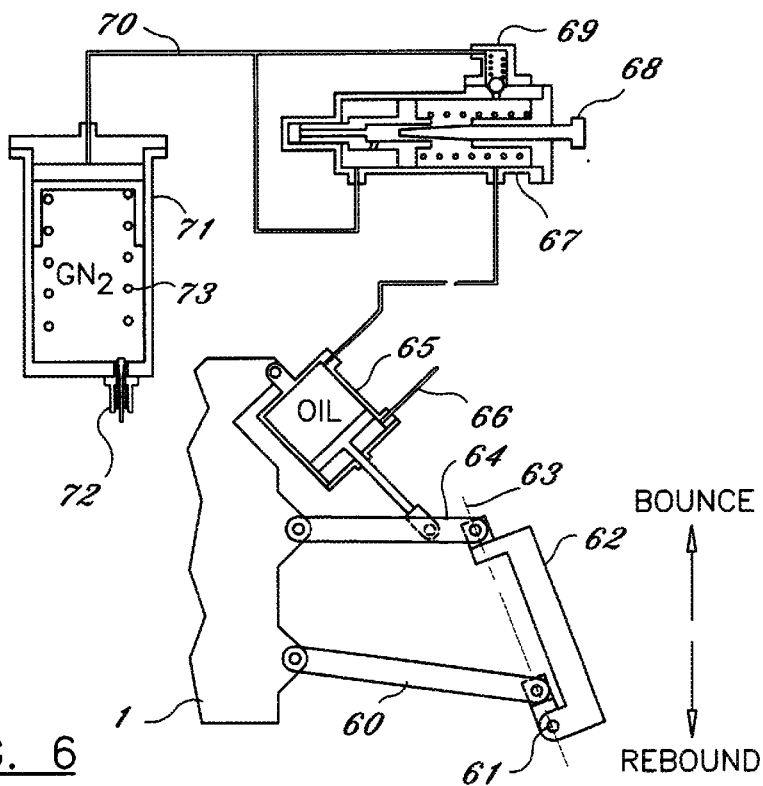
FIG. 6 is a diagrammatic view illustrating the suspension system of the present invention.

Referring to FIG. 6, the spring/shock absorber suspension system is illustrated. The vehicle weight is carried by hydraulic struts 16 and 17 which are pressurized from a pneumatic source. The following legend includes the features and reference numerals shown in FIG. 6:

1 Frame Structure;
60 Lower Arm;
61 Axle (Wheel);
62 Upright;
63 Steering Axis;
64 Upper Arm;
65 Strut (Hydraulic Cylinder 16 or 17)
66 Vent;
67 Progressive Damping Valve;
68 Bypass Valve;
70 Hydraulic Lube(s);
71 Pneumatic Accumulator;
72 Charging Valve (Schrader Valve); and,
73 Spring (Optional).

Front and rear struts 16 and 17 are attached to front and rear upper suspension arms 6 and 7, respectively, and to the frame 1, as described earlier. FIG. 6 illustrates the present invention for one of the two schematically identical suspensions (front and rear). Therefore, reference numeral have been changed to stress that either the front or rear structure is being explained. For example, struts 16 and 17 are referred to hereinbelow as 65.

The strut 65 supports the vehicle weight and when a wheel is forced upward (bounce), the upright 62 moves and the suspension arms 60 and 64 swing, compressing or extending the strut 65. Strut compression actually moves a piston within its cylinder, displacing oil to an external accumulator 71 chamber through a hydraulic line 70. The displacement moves a second piston within the accumulator, in turn compressing gas volume, preferably nitrogen. The adiabatic gas compression exhibits (non-linear) rising rate pressure character. The oil is routed through a compression pressure relief valve 69. The arrangement provides compression damping, approximately 10% of rebound damping, with a reaction force limit preset by design. Rebound motion reverses oil flow back to the respective strut 65. However, on reversal the relief valve 69 functions as a check valve forcing the fluid to take a return path through a variable orifice servo valve, a progressive damping value 67.

The servo valve 67 executes progressive damping resistance on the fluid during rebound. Operation of the valve is as follows. As pressure in the accumulator 71 rises, return flow to the strut 65 is resisted by a variable orifice needle valve, causing a pressure drop across the piston within. The rising pressure drop moves the piston (to the right) against a spring, decreasing the orifice area between needle and its annular seat in the piston. When some of the oil in the accumulator exits, accumulator pressure is reduced by virtue of its larger gas volume, yielding a lower delta pressure across the piston in the damping valve 67. The reduced force permits the spring to move the damping valve piston to the left, opening the variable orifice. Piston displacement is proportional to delta pressure, so the piston position, and area, are readily predictable by design. So, also, is the damping resistance, made proportional to real time accumulator pressure by the damping valve. Note that a fine tuning device is also present, by use of a threaded needle valve 68 equipped with adjuster knob. Because the damping valve is relatively small and can be located anywhere within a hydraulic line, it can also be positioned in the vehicle for convenient rider access. This allows the rider to adjust damping characteristics, within limits, without dismounting.

Damping resistance is proportional to (real-time) accumulator gas pressure. This appears desirable in that rebound damping energy dissipation is tailored to the instantaneous energy stored in the system by compression. This characteristic permits removal of bump energy efficiently in a single cycle, regardless of the amplitude of suspension travel (a function of disturbance size and vehicle speed). Because rebound damping relates to system pressure, it is progressive in character, as is the spring rate, and damping work maintains it proportionality to springing work. The system once adjusted will provide optimum damping matched to any suspension travel, where conventional systems are unmatched for any suspension travel except one (design point travel).

During vehicle braking, it should be noted that weight transfer tends to compress the front suspension while unloading the rear suspension. The system responds with a damping increase at the front and a damping reduction at the rear. This is beneficial in that vibratory energy is removed at its source in proportion to its magnitude resulting in reduced chassis disturbance and better tire contact with the pavement.

Use of pneumatic spring medium delivers progressive or "rising" non-linear rate, demonstrated to give better suspension control. This is executed without the usual linkage or progressively wound springs, as progressive rate is a characteristic of adiabatic gas compression. The nonlinearity may be steeper than ideal, but the effect can be softened by the angled mounting geometry of the strut. The normal component of strut force applied to the arm reduces as the arm rises. A more acute mounting angle of the strut to the arm exaggerates the reduction of normal component with arm travel.

An alternate method to make the rising rate characteristic less severe is offered by the accumulator schematic shown. Note the presence of a coil spring 73 inside the accumulator 71 which assists the gas pressure in loading the piston against the volume of oil contained. This spring 73 can be linear, or progressive; a light spring load, or heavy; or the spring can be omitted completely, leaving the gas pressure to provide the force against the piston. If a linear spring is used, and the gas charging pressure is reduced an appropriate amount, the overall (fluid) pressure versus travel curve results from the sum of the two individual pressure curves. Possible variations between low gas pressure/high linear spring rate and pressure alone indicate the wide range of suspension springing characteristics available (by detail design) when using the described suspension system.

Note that strut line of action lies in the chassis center plane. (See FIGS. 3 and 4). This is an important feature of the suspension geometry. It ensures that suspension arms do not twist, resisting the primary wheel load in-plane. Moreover, no torsional loading is applied to the frame, which might cause torsional deflection. Frame torsional flex can cause unwanted chassis steering.

Figure 7:
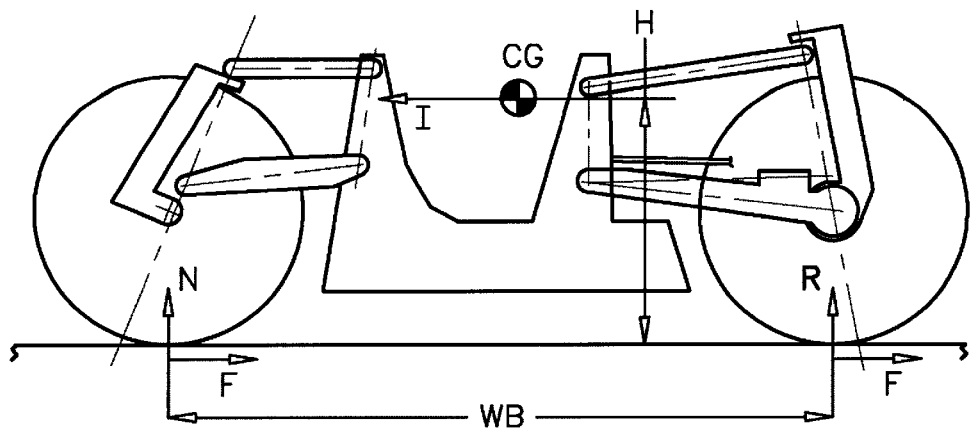
FIG. 7 is a diagrammatic view illustrating vehicle braking forces for anti-dive features of the present invention.
Figure 8:
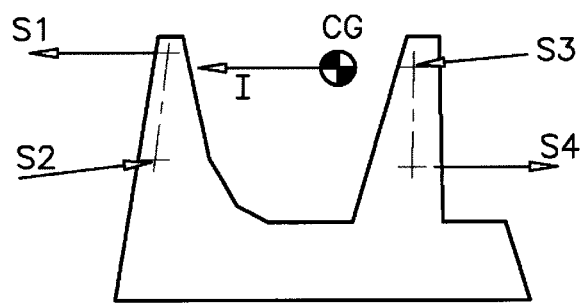
FIG. 8 is a diagrammatic view illustrating frame braking forces for anti-dive features of the present invention.
Figure 9:
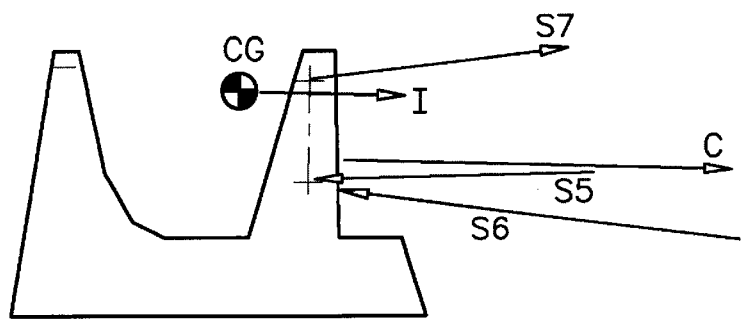
FIG. 9 is a diagrammatic view illustrating frame acceleration forces for anti-squat features of the present invention.

Referring to FIGS. 7–9, mechanical elements that control wheel motion relative to the chassis are configured and arranged to prevent "dive" during braking and "squat" during acceleration. The following legend includes the definitions of reference numerals shown in FIGS. 7–9:

I Inertia Force due to Deceleration (or Acceleration);
CG Center of Gravity;
F Braking Force on the Front Wheel;
R Braking Force on the Rear Wheel;
N Normal Force on the Wheel due to Weight Transfer;
WB Wheelbase length;
H Height to Center of Gravity;
S1 and S2 Forces on Front Static Pivots of the Frame Under Braking;
S3 and S4 Forces on Rear Static Pivots of the Frame Under Braking;
S5, S6, and S7 Forces on Rear Static Pivots of the Frame Under Acceleration; and,
C Drive Chain Force Acting on Engine Mounts Attached to the Frame Under Acceleration.

Dive is a tendency for elevation attitude to pitch forward in proportion to brake load. If telescopic forks are used for front suspension, dive causes ride height to be reduced, the steering geometry to change, and a reduction in front wheel travel available to absorb bumps while braking. Squat reverses the pitch attitude, also changing steering geometry and reducing available rear wheel travel during acceleration. Both phenomena reduce ground clearance, and therefore cornering bank angle must be reduced to avoid grounding of the chassis. Thus, a machine that dives or squats, cannot corner as fast as one that does neither.

Rear suspension squat loosens the drive chain by virtue of the rear swing arm pivot residing aft of the countershaft sprocket center. Additionally, the sudden pitch changes associated with dive and squat cause rider anxiety in comparison to a stable platform lacking these pitch changes.

Conventional motorcycle design accommodates the loss of steering caster angle and trail associated with dive by increasing the amount of static trail. Thus, a static trail of four inches may reduce to two inches or less under heavy braking. This translates to slow steering response under light braking and much quicker steering response with severe dive. If dive is eliminated, the machine can be given perhaps two inches of trail and response will be quicker and more consistent.

FIG. 7 shows the effect of braking force in a free body diagram of the entire motorcycle. Gravity forces and reactions are not shown, for simplification, because they are not altered by braking or acceleration. Normal forces N are weight transfer reactions where N=I*H/WB. If the wheels were to be guided by the vertical telescoping sliders these normal forces would be absorbed in the chassis by loading changes in the suspension springs (not shown). A reduction in frame height would occur in the front (spring compression) and an increase in height at the rear (spring extension) due to the elastic nature of springs (spring rate). However, the use of double link suspension arms transforms braking moments on the suspension into directed forces on the frame. This is illustrated in FIG. 8.

Suspension arms are two force members (tension or compression between pivots at each end), and forces are readily quantified. The magnitude of forces S1 through S4 are indicated by vector length in the figures. Note in FIG. 8 that the force S2 exhibits a substantial upward component, tending to lift the front of the main frame, and force S3 a downward component, pulling the rear of the frame downward. These resist the forward rotation (dive), described earlier, due to weight transfer. Thus, less suspension spring compression (front) and extension (rear) is needed to achieve moment balance on the frame, and less rotation will occur. Note also that the sum of vertical components results in a net upward force on the frame, from the road surface. The frame will rise on its suspension springs until force balance is again achieved, to enhance ground clearance under braking.

Referring to FIG. 9, acceleration imposes the same type of chassis response as braking, except the direction of forces are reversed, and forces are not distributed between wheels. Anti-squat geometry is contained in the rear suspension configuration alone. FIG. 9 illustrates the forces directed into the frame by wheel traction, S5 and S7. Two new forces, S6 and C, are due to drive chain tension, their magnitude a function of rear sprocket diameter and wheel diameter in addition to acceleration rate. As before, the force magnitudes are represented by vector length in the figure and forces are readily quantified. Again, note the combined forces at the rear of the frame exert a net upward force. This counteracts weight transfer forces that would compress the rear suspension under acceleration.

Leading link front suspension can readily incorporate anti-dive geometry, without addition of ancillary hardware. However, leading link front suspension does exhibit additional steering friction.

Referring to FIGS. 10–13, present leading link suspensions typically utilize spherical plain bearings at the steering axis location of upper and lower links. Braking torque and, to a lesser degree, cornering forces increase bearing load such that the resistance to steering input rises, a clearly undesirable characteristic. The following legend includes the features and reference numerals shown in FIG. 10:

75 Steering Axis;
76 Spherical Rod End Bearing;
77 Needle Bearing;
78 Shoulder Bolt;
79 Thrust Washer (3x);
80 Flat Washer;
81 Nut; and,
82 Upright Member.

Figure 11:
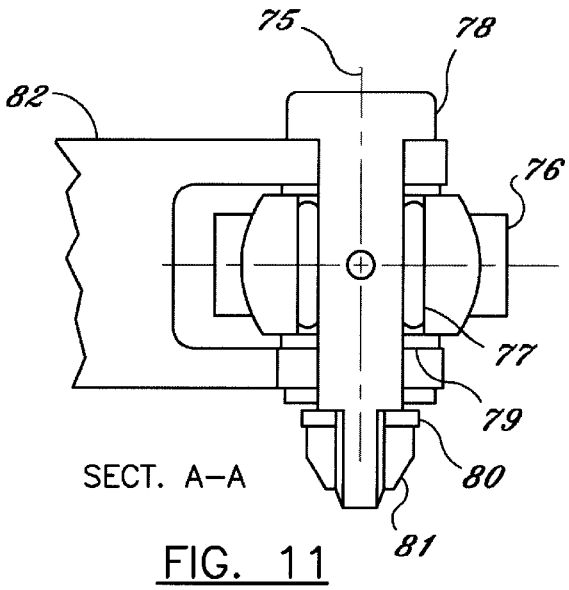
FIG. 11 is a cross-sectional view taken along line A—A in FIG. 6.

The following legend includes the features and reference numerals shown in FIG. 11:

75 Steering Axis;
83 Upper Suspension;
82 Upright Member;
84 Needle Bearing (2x);
85 Ball Bearing;
86 Pivot Bolt;
81 Nut;
87 Spider;
88 Spacer (2x);
89 Cap (2x);
90 Cap Bolt (4x); and,
91 Retainer Ring.

Figure 10:
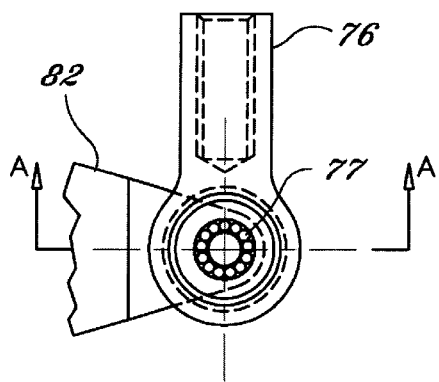
FIG. 10 is a side elevational view of steering pivot bearings of the present invention.
Figure 12:
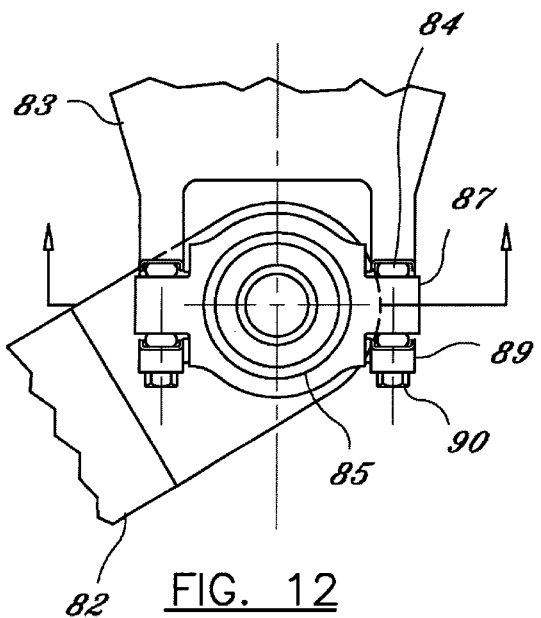
FIG. 12 is a side elevational view of steering pivot bearings of the present invention.
Figure 13:
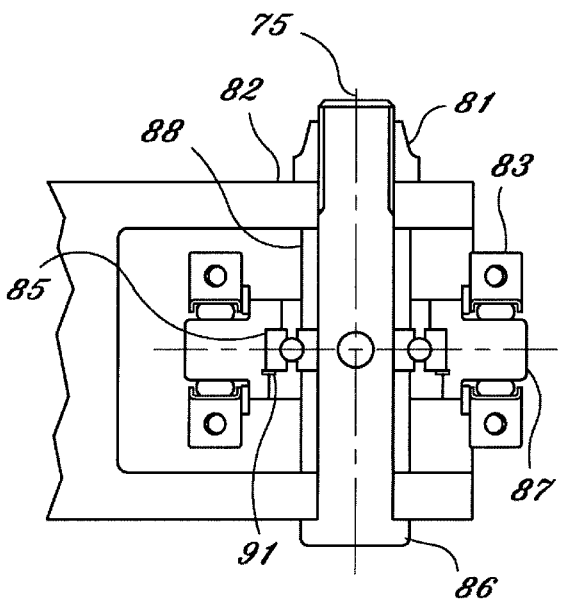
FIG. 13 is a cross-sectional view taken along line B—B in FIG. 8.

The present invention incorporates rolling element bearings concentric within the spherical steering pivot plain bearings, see FIGS. 10 and 11, such that no significant steering effort is experienced when bearing loads are increased. An alternate solution is shown in FIGS. 12 and 13, where a two (2) axis rolling element bearing arrangement is utilized to give the necessary degrees of freedom. The latter gimbal type resembles a universal joint with one bearing axis aligned with steering axis, and the other aligned parallel to the arm static pivot axis. Both types are employed in the present invention, the two (2) axis type at the upper arms and spherical type at the lower arms.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An advanced motorcycle chassis, comprising:
a monocoque frame having means for attachment of a pair of substantially separated leading suspension arms and a pair of substantially separated trailing suspension arms, said frame including means for producing torsional stiffness between forward suspension arm attachment points and aft suspension arm attachment points,
wherein said frame further include means for storing fuel within hollow portions of the frame.

2. An advanced motorcycle chassis, comprising:
a monocoque frame having means for attachment of a pair of substantially separated leading suspension arms and a pair of substantially separated trailing suspension arms, said frame including means for producing torsional stiffness between forward suspension arm attachment points and aft suspension arm attachment points,
further including geometric arrangement of elements comprising the chassis to prevent hump-steer,
wherein said pair of substantially separated leading suspension arms are connected to a front upright member by at least one two-axis pivot; said front upright member connectable to a front axle for attachment of a front wheel; and,
means for steering said front wheel via rotation of the front upright member about the said at least one two-axis pivot.

3. The motorcycle chassis of claim 2, wherein said front upright member includes a front upright steering arm, and said means for steering includes steering linkage comprising: a handlebar connected to an upper front link, said upper front link connected to a front idler arm of the steering linkage, said idler arm connected to a lower front link, said lower front link connected to said front upright steering arm.

4. An advanced motorcycle chassis, comprising:
a monocoque frame having mesh for attachment of a pair of substantially separated leading suspension arms and a pair of substantially separated trailing suspension arms, said frame including means for producing torsional stiffness between forward suspension arm attachment points and aft suspension arm attachment points,
further including geometric arrangement of elements comprising the chassis to prevent bump-steer,
wherein each member of said pair of trailing suspension arms are connected pivotably to a rear upright member, said rear upright member connectable to a rear axle for attachment of a rear wheel.

5. The motorcycle chassis of claim 4, wherein said pair of leading suspension arms are connected to a front upright member; said front upright member connectable to a front axle for attachment of a front wheel; and,
means for simultaneous steering of said front wheel and said rear wheel.

6. The motorcycle chassis of claim 5, wherein said front upright member includes a front upright steering arm, and said means for steering said front wheel and said rear wheel includes steering linkage comprising: a handlebar connected to an upper front link, said upper front link connected to a front idler arm, said idler arm connected to a lower front link, said lower front link connected to said front upright steering arm;
said rear upright member includes a rear steering arm, said steering linkage further comprising: said front idler arm connected to a intermediate link, said intermediate link connected to a rear idler arm, said rear idler arm connected to a rear link, said rear link connected to said rear steering arm, wherein turning said handlebar simultaneously steers said front and said rear wheels.

7. The motorcycle chassis of claim 6, wherein said front and said rear wheels are steered in a ratio of approximately five to one, respectively, with respect to turning of said handlebar.

8. The motorcycle chassis of claim 6, wherein approximately 1.25 degrees of rotation of said handlebar results in approximately 1 degree of rotation of said front wheel.

9. An advanced motorcycle chassis, comprising:
a monocoque frame having means for attachment of a pair of substantially separated leading suspension arm and a pair of substantially separated trailing suspension arms, said frame including means for producing torsional stiffness between forward suspension arm attachment points and aft suspension arm attachment points,
further including geometric arrangement of elements comprising the chassis to prevent bump-steer,
further including at least one shock absorber pivotably connected to said frame and pivotably connected to one said pair of leading suspension arms, said shock absorber being coincident with a tire center plane to avoid twist in said frame and said connected leading suspension arm.

10. An advanced motorcycle chassis, comprising:
a monocoque frame having means for attachment of a pair of substantially separated leading suspension arms and a pair of substantially separated trailing suspension arms, said frame including means for producing torsional stiffness between forward suspension arm attachment points and aft suspension arm attachment points,
further including geometric arrangement of elements comprising the chassis to prevent bump-steer,
further including at least one shock absorber connected between said frame and one said pair of trailing suspension arms, said shock absorber being coincident with a rear tire center plane to avoid twist in said frame and said connected trailing suspension arm.

11. The motorcycle chassis of claim 9, wherein said at least one shock absorber includes means for providing a controlled progressive spring rate by gas pressure changes in a pneumatic accumulator in response to vertical motion of said front wheel.

12. The motorcycle chassis of claim 11, wherein said controlled progressive spring rate is actively adjusted during vehicle operation.

13. The motorcycle chassis of claim 12, wherein said controlled progressive spring rate includes damping that is actively adjusted during vehicle operation.

14. The motorcycle chassis of claim 13, wherein said damping adjustment includes means for operator adjustment during vehicle motion.

15. The motorcycle chassis of claim 10, wherein said at least one shock absorber includes means for providing a controlled progressive spring rate in response to vertical motion of said rear wheel.

16. The motorcycle chassis of claim 15, wherein said controlled progressive spring rate by a progressive damping valve includes damping that is actively adjusted during vehicle operation.

17. The motorcycle chassis of claim 16, wherein said damping adjustment includes means for operator adjustment during vehicle motion.

* * * * *